(12) United States Patent
Rodi

(10) Patent No.: US 6,465,773 B1
(45) Date of Patent: Oct. 15, 2002

(54) OPTICAL MEASUREMENT MODULE FOR MEASURING ANGLES AND/OR DISTANCES

(75) Inventor: Anton Rodi, Leimen (DE)

(73) Assignee: HERA Rotterdam B.V., Rotterdam (NL)

( * ) Notice: Subject to any disclaimer, the term of this patent is extended or adjusted under 35 U.S.C. 154(b) by 28 days.

(21) Appl. No.: 09/716,337

(22) Filed: Nov. 20, 2000

(30) Foreign Application Priority Data

Nov. 18, 1999 (CH) ............................................. 2106/99

(51) Int. Cl.$^7$ .............................. G01D 5/34; G01J 9/00

(52) U.S. Cl. .............................. 250/231.17; 250/231.18

(58) Field of Search ....................... 250/231.17, 231.18, 250/231.13, 231.14, 231.15, 231.16

(56) References Cited

U.S. PATENT DOCUMENTS 6,320,185 B1 * 11/2001 Matsuo .................. 250/231.13

FOREIGN PATENT DOCUMENTS

DE         195 05 176 A1     8/1995

* cited by examiner

Primary Examiner—Hung Xuan Dang
(74) Attorney, Agent, or Firm—Laurence A. Greenberg; Werner H. Stemer; Ralph E. Locher

(57) ABSTRACT

An optical angle and/or distance measurement module for measuring its position with respect to a scale embodiment contains a device for light detection and a device for imaging part of the scale embodiment on the light detection device. In addition, the module contains a beam splitter, through the use of which firstly incident light can be guided onto the scale embodiment and secondly, light coming from the scale embodiment can be guided to the detection device. The module can contain two module elements, of which a first module element contains the light detection device and a second module element contains a device for permitting a sliding relative movement with respect to the scale embodiment. An integrated incorporated measurement transmitter can be implemented with the module. The measurement transmitter can be incorporated cost-effectively and in an integrated manner and nevertheless permits a high resolution.

16 Claims, 2 Drawing Sheets

OPTICAL MEASUREMENT MODULE FOR MEASURING ANGLES AND/OR DISTANCES

BACKGROUND OF THE INVENTION

FIELD OF THE INVENTION

The invention relates to an optical measurement module for measuring angles and/or distances and to an optical measurement transmitter.

For technical applications which require angle or distance measurement it is often expedient to incorporate angle and distance measurement systems into existing instruments. Hitherto, this has predominantly been carried out by using so-called closed transmitter systems, which include a scale embodiment and an operational measurement head. These closed transmitter systems have their dedicated mounting consequently integrated therein and have to be fastened in an appropriate way through the use of coupling devices to the object to be measured. The construction of these measurement transmitters is voluminous and expensive as a result of the dedicated mounting. Furthermore, fixing these measurement transmitters, for example to the ends of shafts in the case of angle measurement transmitters, is often a disruptive procedure when these transmitter systems are installed. The transmitter systems are therefore complicated in terms of production and mounting.

Solutions using so-called incorporated transmitters (without a dedicated mounting), have so far been used only in the case of low angular resolutions and clean environmental conditions, and have not become generally accepted. Although the bearings are dispensed with, the inadequate precision mounting, the complicated adjustment, the required clean rooms, the problematic illumination and imaging conditions have been a hindrance and have not permitted any use. The incident-light illumination desired in the case of incorporated transmitters needs complicated, expensive and sensitive surface structures (defractive optical structures) for the embodiments of the scale, in order to achieve an adequate image, since, as a result of the necessary obliquely incident illumination, no mirror-reflective substrate surfaces are permitted. These specific optical surfaces are complicated and can be implemented only with expensive tools, and are very sensitive.

SUMMARY OF THE INVENTION

It is accordingly an object of the invention to provide an optical measurement module for a high-resolution angle and/or distance measurement transmitter, and such a measurement transmitter which overcome the above-mentioned disadvantages of the heretofore-known measurement modules and measurement transmitters of this general type and wherein the measurement module can be incorporated in an integrated manner.

With the foregoing and other objects in view there is provided, in accordance with the invention, in combination with a scale embodiment an optical measurement module for measuring angles and/or distances for determining a position of the optical measurement module with respect to the scale embodiment, the optical measurement module includes:

a detection device for detecting light;

an imaging device for imaging a part of the scale embodiment onto the detection device; and a light guiding device for guiding incident light to the scale embodiment and for guiding light coming from the scale embodiment to the detection device.

In other words, the optical angle and/or distance measurement module according to the invention for measuring its position with respect to a scale embodiment includes a device for light detection and a device for imaging a part of the scale embodiment onto the detection device. It also contains a device through the use of which, firstly, incident light can be led onto the scale embodiment and, secondly, light coming from the scale embodiment can be led to the detection device.

With the objects of the invention in view there is also provided, an optical measurement transmitter, having a sensing head including an optical measurement module for measuring angles and/or distances; a scale embodiment; the sensing head determining a position of the optical measurement module with respect to the scale embodiment; and the optical measurement module including a detection device for detecting light, an imaging device for imaging a part of the scale embodiment onto the detection device, and a light guiding device for guiding incident light to the scale embodiment and for guiding light coming from the scale embodiment to the detection device.

In other words, the optical measurement transmitter according to the invention includes a sensing head and a scale embodiment that can be moved relative to the sensing head, the sensing head containing an optical angle and/or distance measurement module according to the invention.

As a result of the measures according to the invention, the patterns on virtually all substrate surfaces can be registered by the virtually "reflective" or diffusely reflecting planar structures, which can be applied simply by using known lithographic etching processes, printing and/or laser-writing processes. Thus, even structures written in a simple way, for example by a beam, on shafts and drums are possible, and particularly inexpensive angle and/or distance measurement systems can be implemented.

According to another feature of the invention, a light source is provided for producing the incident light.

According to yet another feature of the invention, the light source is a light-emitting diode or a laser diode.

According to a further feature of the invention, the scale embodiment has a surface area. An intermediate part is provided for maintaining a given distance between the optical measurement module and the scale embodiment in a direction perpendicular to the surface area of the scale embodiment and/or the intermediate part permits a relative movement of the optical measurement module with respect to the scale embodiment.

According to another feature of the invention, the intermediate part is a sliding surface.

According to yet another feature of the invention, a first module element and a second module element are provided, the first module element containing the detection device and the second module element containing the intermediate part for permitting the relative movement.

According to another feature of the invention, a positioning device maintains a defined position of the optical measurement module with respect to the scale embodiment in a direction of an areal extent of the scale embodiment.

According to another feature of the invention, the optical measurement module has a relative position with respect to the scale embodiment, the relative position is defined by an absolute value and an incremental value. The detection device has light-sensitive areas for registering both the absolute value and the incremental value of the relative position.

According to a further feature of the invention, the detection device supplies output signals. An electronic device processes the output signals from the detection device for forming a total absolute value of a relative position of the optical measurement module with respect to the scale embodiment.

According to another feature of the invention, the imaging device images a part of the scale embodiment telecentrically onto the detection device. According to yet another feature of the invention, the imaging device includes an imaging lens and an aperture stop acting as an exit pupil or an aperture diaphragm.

According to a further feature of the invention, a supporting body is formed of plastic, and the imaging device is integrated in the supporting body.

The further configurations of the invention in particular permit the high-resolution incorporation of precision transmitters, in which mechanical tolerances during incorporation and operation are compensated. An intermediate part which slides easily and is flexible not only contributes to the simple mounting or maintenance of the incorporated transmitter; instead, not inconsiderable mechanical deflections of the scale embodiment (e.g. motor shaft ends or rules) are automatically compensated for. In addition, according to the invention, the intermediate part is configured in such a way that a plastic optical system created in a cost-effective manner is protected to the greatest possible extent against vapors, dust, etc. on a sensitive lens surface.

The configuration according to the invention, allows a cost-effective production of the measurement head and the scale embodiment, and of the high-resolution measurement systems, since the incident-light illumination permits simple labelling, and the mounting and incorporation tolerances, as well as dirty environmental influences, are coped with.

The measurement module according to the invention can be used both in "open" measurement transmitters, the measurement module preferably moving in a sliding manner on the scale embodiment, and in "closed" measurement transmitters. The measurement module is preferably incorporated in the measurement transmitter in such a way that it maintains a defined distance from the scale embodiment, which is likewise incorporated.

Other features which are considered as characteristic for the invention are set forth in the appended claims.

Although the invention is illustrated and described herein as embodied in an optical angle and/or distance measurement module, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
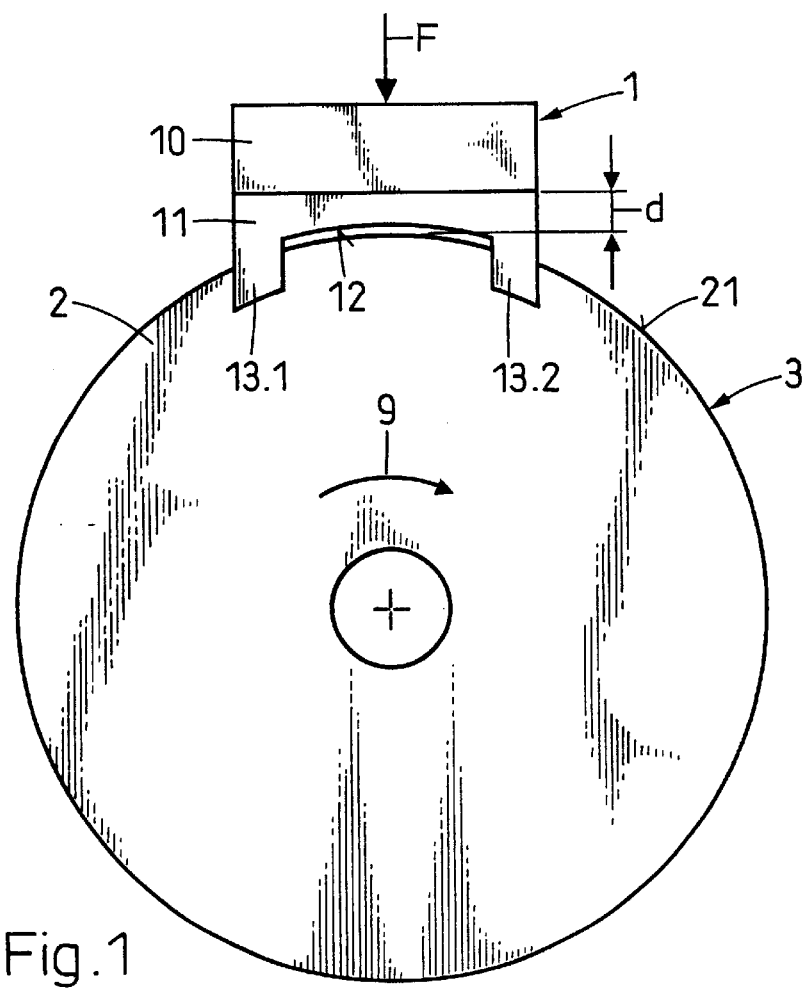
FIG. 1 is a diagrammatic side view of an angle measurement transmitter according to the invention.

Referring now to the figures of the drawings in detail and first, particularly, to FIG. 1 thereof, there is shown an angle measurement transmitter according to the invention in a side view. The angle measurement transmitter has the task of measuring the angular position of a measurement module 1 with respect to a rotatable part 2, for example a motor shaft. The relative movement of the measurement module 1 with respect to the part 2 is indicated by an arrow 9. The relative movement for this exemplary embodiment of an angle measurement transmitter is the relative rotation. On the surface 21 of the rotatable part 2 which faces the measurement module 1, in this example on the outer surface of the cylindrical shaft, there is applied a scale embodiment 3, for example in the form of a linear code. The measurement module 1 contains a device for illuminating the scale embodiment 3, for detecting the light coming from the scale embodiment 3 and for imaging the scale embodiment 3 onto the detection device. The detection device will be explained with reference to FIG. 3.

The measurement module 1 preferably contains a supporting body 10 and a device 11 for maintaining an (arbitrarily) defined distance d with respect to the scale embodiment 3, in the direction perpendicular to the areal extent of the scale embodiment 3, and/or for permitting a relative movement with respect to the scale embodiment 3. For this purpose, the measurement module 1 can include a module element 11 whose surface 12 facing the scale embodiment 3 is matched geometrically to the scale embodiment 3, for example with regard to its radius of curvature, and, by virtue of its material properties, slides on the scale embodiment 3 with very low friction. In order to continually maintain the desired defined distance d with respect to the scale embodiment 3, it is advantageous to provide a device for pressing the measurement module 1 onto the scale embodiment 3 with a suitable pressing force F. Such a pressing device can be configured, for example, as slightly prestressed compression springs.

In addition, a device 13.1, 13.2 for maintaining a defined position with respect to the scale embodiment 3 can be provided in the areal extent of the scale embodiment 3. The intermediate part 11 or a transmitter housing can rest in a sliding manner on the moveable part 2, guided laterally, for example, and in this way ensures a pure rotational movement of the measurement module 1 with respect to the part 2. In this way, any disruptive deviations or measurement errors can be avoided.

Figure 2:
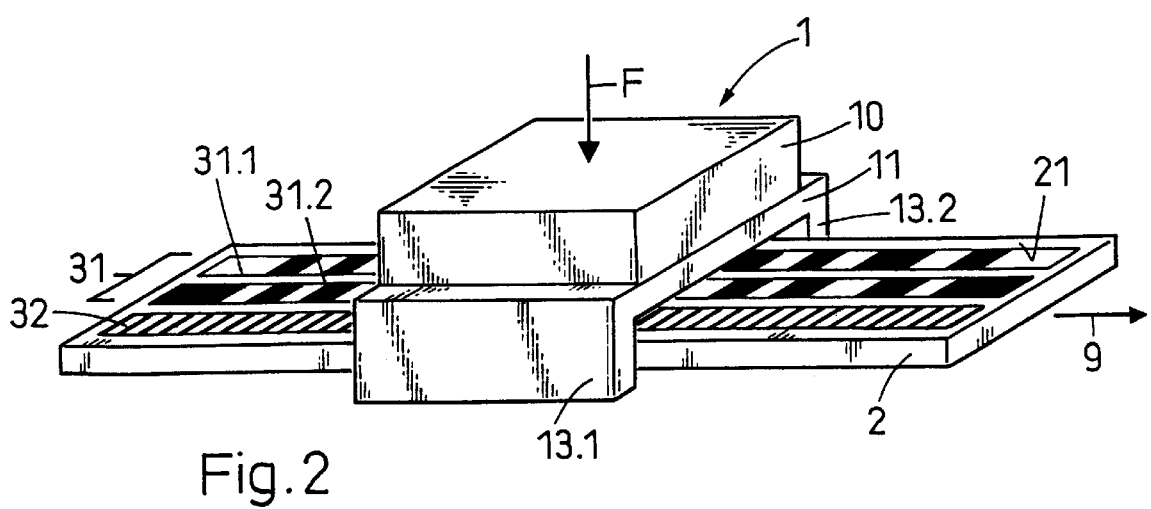
FIG. 2 is a perspective view of a distance measurement transmitter according to the invention.

FIG. 2 illustrates a distance transducer in a perspective view. It has the task of measuring the position of a measurement module 1 with respect to a linearly displaceable part 2, for example a rule or scale. Apart from the fact that the embodiment of FIG. 1 shows an angle measurement transmitter, the explanations made with regard to FIG. 1 also apply in a similar way for the distance transducer of FIG. 2.

On that surface 21 of the rule which faces the measurement module 1, the scale embodiment 3 is schematically shown in FIG. 2. It includes, for example, an absolute track 31 with a linear code, which is represented by reflective areas ("1") and absorbent areas ("0"), and an incremental track 32 for fine resolution between two values of the absolute track 31. For the purpose of performing a difference formation, which is advantageous for signal processing, the absolute track 31 can include two partial tracks 31.1, 31.2 which bear the same code but are inverted with respect to each other (i.e. a "0" on the first partial track 31.1 corresponds to a "1" on the second partial track 31.2 and vice versa). For details relating to the detection and evaluation of the absolute and incremental tracks, reference is made to the specification of Published, Non-Prosecuted German Patent Application No. DE 195 05 176.9, which is hereby incorporated by reference into the present specification.

Here, too, a device 13.1, 13.2 for maintaining a defined position with respect to the scale embodiment 3 can additionally be provided in the areal extent of the scale embodiment 3, in order to ensure a purely linear relative movement of the measurement module 1 with respect to the part 2.

Figure 3:
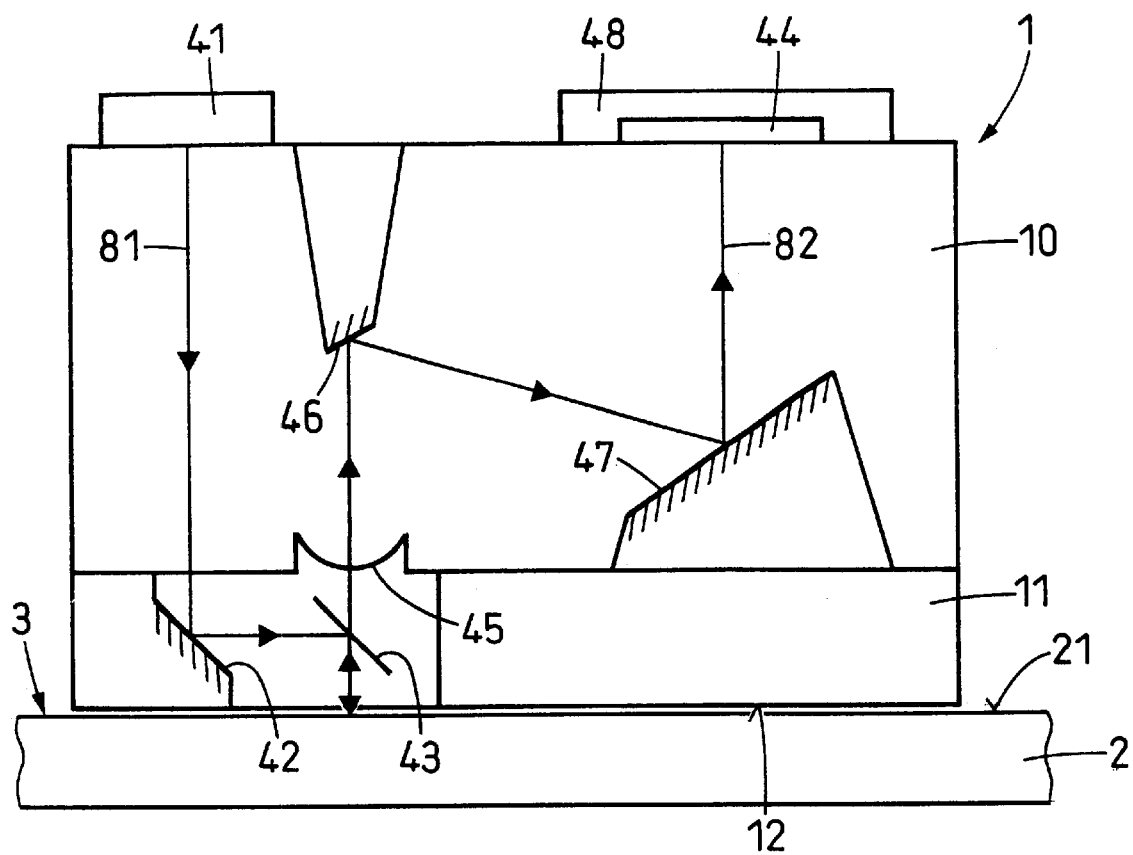
FIG. 3 is a cross-sectional view of an embodiment of the measurement transmitter according to the invention illustrating the beam path in the measurement transmitter.

FIG. 3 shows the beam path in a cross section of one embodiment of the measurement transmitter according to the invention. The measurement transmitter includes a measurement module 1 and a scale embodiment 3 which can be moved in relation to the measurement module 1 or to a part 2. The measurement module 1 is essentially based on a supporting body 10 made of plastic or an appropriately configured metal, which is expediently coated. It can be fabricated from two partial modules 10, 11 or else in one piece. Its surface 12 facing the scale embodiment 3 is configured in such a way that the measurement module 1 maintains a defined distance from the scale embodiment 3 and slides with very low friction and virtually without wear over the scale embodiment 3.

The measurement module 1 can include a light source 41, for example a light-emitting diode (LED) or a laser diode. Alternatively, light can also be produced outside the measurement module 1 and can be incident on or coupled into the measurement module 1 on a suitable beam path. In this specification, the term "light" is understood to include any type of electromagnetic radiation, that is to say, for example, visible light, but also infrared or ultraviolet radiation. Incident light 81 passes via a first reflective element 42 to a beam splitter or partially transparent mirror 43, from which some of the light is reflected onto the scale embodiment 3. Light 82 reflected and/or scattered from the scale embodiment 3 is partially transmitted by the beam splitter 43 and passes onto a light detection device 44. The illuminated part of the scale embodiment 3 is imaged by a lens 45 onto the light detection device. The image is preferably telecentric, wherein a second reflector 46 with a small area can serve as an aperture stop which acts as an aperture diaphragm or exit pupil. By using such a telecentric mirror or an aperture stop 46 at the focal point of the lens 45, it is possible to achieve the situation where the image of the scale embodiment 3, enlarged by the imaging scale, remains constant in terms of its dimension in the image plane on the light detection device 44, even if the width of the object varies within small ranges (e.g. because of run-out or eccentricity of the scale embodiment 3). The beam path can, if required, be influenced by further optical elements, such as a third reflective element 47.

The reflective elements 42, 46, 47 can be configured, for example, as interfaces between plastic 10 and air. These interfaces are preferably provided with at least one reflective metal layer and/or with a reflective system of dielectric layers.

Using optical polarization elements, including a polarization-dependent beam splitter 43, a situation may be achieved where essentially 100% of the incident light 81 is reflected, and essentially 100% of the light 82 passing to the detector 44 is transmitted. This would result in a high light yield, a higher signal/noise ratio and ultimately a higher sensitivity.

The light detection device 44 can be, for example, photodiodes with a specific geometric shape, as described in Published, Non-Prosecuted German Patent Application No. DE 195 05 176.9. The light detection device is preferably integrated in a special application-specific integrated circuit (ASIC) 48, which also contains specific hardware for signal processing and fine-value interpolation (see Published, Non-Prosecuted German Patent Application No. DE 195 05 176.9). In another embodiment, this ASIC 48 can also contain the light source 41 and its drive system.

The measurement module 1 can be suspended on a printing circuit board, which at the same time can be used as a mechanical fixing for the module 1 and as an electrical connection for power and/or signals to and/or from the module In view of the disclosure of the invention, those skilled in the art can configure further embodiments, which are within the scope of the invention. For example, the incident light 81 from the light source 41 could also be transmitted by the beam splitter 43, and the light 82 reflected by the scale embodiment 3 could be reflected by the beam splitter 43. Other mechanical constructions are also conceivable. Thus, for example, in the case of a rotary encoder, the scale embodiment could of course be applied to a base surface of the rotating part 2 instead of to the outer surface 21 as in the exemplary embodiment of FIG. 1.

I claim:

1. In combination with a scale embodiment an optical measurement module for measuring at least one of angles and/or distances for determining a position of the optical measurement module with respect to the scale embodiment, the optical measurement module comprising:

a detection device for detecting light;

an imaging device for imaging a part of the scale embodiment onto said detection device; and a light guiding device for guiding incident light to the scale embodiment and for guiding light coming from the scale embodiment to said detection device.

2. The optical measurement module according to claim 1, including a light source for producing the incident light.

3. The optical measurement module according to claim 2, wherein said light source is a light-emitting diode.

4. The optical measurement module according to claim 2, wherein said light source is a laser diode.

5. The optical measurement module according to claim 1, wherein:

the scale embodiment has a surface area; and an intermediate part is provided for maintaining a given distance between the optical measurement module and the scale embodiment in a direction perpendicular to the surface area of the scale embodiment.

6. The optical measurement module according to claim 5, wherein said intermediate part permits a relative movement of the optical measurement module with respect to the scale embodiment.

7. The optical measurement module according to claim 1, including an intermediate part for permitting a relative movement of the optical measurement module with respect to the scale embodiment.

8. The optical measurement module according to claim 7, wherein said intermediate part is a sliding surface.

9. The optical measurement module according to claim 7, including a first module element and a second module element, said first module element containing said detection device and said second module element containing said intermediate part for permitting the relative movement.

10. The optical measurement module according to claim 1, wherein:

the scale embodiment has an areal extent; and a positioning device maintains a defined position of the optical measurement module with respect to the scale embodiment in a direction of the areal extent.

11. The optical measurement module according to claim 1, wherein:

the optical measurement module has a relative position with respect to the scale embodiment, the relative position is defined by an absolute value and an incremental value; and said detection device has light-sensitive areas for registering both the absolute value and the incremental value of the relative position.

12. The optical measurement module according to claim 1, wherein:

said detection device supplies output signals; and an electronic device processes the output signals from said detection device for forming a total absolute value of a relative position of the optical measurement module with respect to the scale embodiment.

13. The optical measurement module according to claim 1, wherein said imaging device images a part of the scale embodiment telecentrically onto said detection device.

14. The optical measurement module according to claim 13, wherein said imaging device includes an imaging lens and an aperture stop acting as an exit pupil.

15. The optical measurement module according to claim 1, including:

a supporting body formed of plastic; and said imaging device being integrated in said supporting body.

16. An optical measurement transmitter, comprising:

a sensing head including an optical measurement module for measuring at least one of angles and/or distances;

a scale embodiment;

said sensing head determining a position of said optical measurement module with respect to said scale embodiment; and said optical measurement module including a detection device for detecting light, an imaging device for imaging a part of said scale embodiment onto said detection device, and a light guiding device for guiding incident light to said scale embodiment and for guiding light coming from said scale embodiment to said detection device.

* * * * *